(12) United States Patent
Burgoyne

(10) Patent No.: US 7,713,103 B2
(45) Date of Patent: May 11, 2010

(54) COOLING SYSTEM OF AN AMPHIBIOUS VEHICLE

(75) Inventor: Jeremy Malcolm Burgoyne, Coventry (GB)

(73) Assignee: Gibbs Technologies Ltd, Warwickshire (GB)

( * ) Notice: Subject to any disclaimer, the term of this patent is extended or adjusted under 35 U.S.C. 154(b) by 0 days.

(21) Appl. No.: 11/597,216

(22) PCT Filed: May 24, 2005

(86) PCT No.: PCT/GB2005/002052

§ 371 (c)(1),
(2), (4) Date: Aug. 20, 2007

(87) PCT Pub. No.: WO2005/115774

PCT Pub. Date: Dec. 8, 2005

(65) Prior Publication Data

US 2008/0032572 A1 Feb. 7, 2008

(30) Foreign Application Priority Data

May 24, 2004 (GB) ................................. 0411548.1

(51) Int. Cl.
*B63H 21/14* (2006.01)
*F01P 3/20* (2006.01)
*F02B 61/04* (2006.01)
*B63H 21/10* (2006.01)
*B63H 21/38* (2006.01)

(52) U.S. Cl. .................................. 440/88 C; 440/88 R

(58) Field of Classification Search ....... 440/12.5–12.7; 123/41.56, 41.57, 41.59, 41.7, 41.63, 41.65; 180/68.1, 68.2
See application file for complete search history.

(56) References Cited

U.S. PATENT DOCUMENTS

| 1,174,216 | A |   | 3/1916  | Wilkerson |
| 1,816,161 | A | * | 7/1931  | Strauss ................. 123/41.64 |
| 1,925,415 | A | * | 9/1933  | Strauss ................... 180/68.1 |
| 1,934,385 | A | * | 11/1933 | Strauss ................... 180/89.1 |
| 2,341,165 | A |   | 2/1944  | Todd |
| 2,397,791 | A |   | 4/1946  | Kramer et al. |
| 2,397,792 | A |   | 4/1946  | Kramer et al. |
| 2,993,462 | A | * | 7/1961  | Gough ....................... 440/44 |
| 3,114,347 | A |   | 12/1963 | Trippel |
| 3,266,591 | A | * | 8/1966  | Sampietro et al. ....... 180/68.1 |

(Continued)

FOREIGN PATENT DOCUMENTS

DE        1530911        7/1969

(Continued)

Primary Examiner—Daniel V Venne
(74) Attorney, Agent, or Firm—Fulwider Patton LLP

(57) ABSTRACT

Amphibious vehicle 3 has one or more ducts 9 running from a first to a second end of the vehicle; from vent 5 to vent 7, or vice versa. The vehicle prime mover 19, transmission, brakes, and/or electronic controls, may be cooled in the duct. Fan 19 draws or blows air through the duct. The hull may comprise one wall of the or each duct; hull surface coolers may be provided for cooling liquid. The duct(s) may pass through one or more bulkhead(s) 11, 13 of the vehicle. A separate engine cooling system may comprise a radiator 23 and fans 29. The marine drive may be a jet drive; the vehicle road wheels (6, FIGS. 4 and 6) may be retractable above the vehicle water line when the vehicle is in marine mode.

31 Claims, 6 Drawing Sheets

U.S. PATENT DOCUMENTS

| | | | |
|---|---|---|---|
| 3,435,798 A * | 4/1969 | Rieli | 440/12.66 |
| 3,446,175 A * | 5/1969 | Boehler et al. | 180/121 |
| 3,903,831 A | 9/1975 | Bartlett et al. | |
| 5,181,478 A * | 1/1993 | Berardi | 440/12.54 |
| 5,417,177 A * | 5/1995 | Taguchi et al. | 440/12.5 |
| 5,490,572 A * | 2/1996 | Tajiri et al. | 180/65.1 |
| 5,690,046 A | 11/1997 | Grzech, Jr. | |
| 5,868,093 A | 2/1999 | Tseng | |
| 6,305,333 B1 | 10/2001 | Maruta et al. | |
| 6,482,052 B1 * | 11/2002 | Giljam | 440/12.51 |
| 6,786,291 B1 * | 9/2004 | Linden et al. | 180/68.2 |
| 2005/0272324 A1 * | 12/2005 | Gibbs | 440/88 C |

FOREIGN PATENT DOCUMENTS

| | | |
|---|---|---|
| DE | 3226827 | 1/1984 |
| EP | 0492655 | 7/1992 |
| EP | 0937959 | 8/1999 |
| GB | 2134857 | 8/1984 |
| JP | 05024420 A * | 2/1993 |
| SU | 1752584 | 8/1992 |

* cited by examiner

COOLING SYSTEM OF AN AMPHIBIOUS VEHICLE

RELATED APPLICATIONS

This application is a U.S. national phase of PCT/GB2005/002052, filed May 24, 2005, which claims priority from Great Britain Application Serial No. 0411548.1, filed May 24, 2004.

The present invention relates to a cooling system for cooling components of an amphibious vehicle.

Amphibious vehicles have unique requirements for cooling of components as a result of the body of the vehicle being in the form of a hull for use of the vehicle on water. The body cannot be provided with openings on the underneath or sides to permit the flow of air for cooling, as are used on road going vehicles, as these openings will permit the ingress of water into the hull.

Cooling of vehicle components, such as transmission components, e.g. drive shafts, gearboxes and brakes, a prime mover, e.g. an internal combustion engine, and electronic components, e.g. an engine management electronic control unit must therefore be achieved using alternative means.

Whilst amphibious vehicle cooling systems are known in the art, most are concerned with providing adequate cooling for an internal combustion engine. These cooling systems take the form of a traditional radiator used to cool a liquid coolant which is circulated around/within an internal combustion engine. However, such systems require complex plumbing arrangements, often passing through structural bulkheads, and are not easily adaptable to cool multiple heat generating sources. Accordingly, there exists a need to improve on known amphibious cooling systems.

According to a first aspect of the present invention, there is provided a cooling system of an amphibious vehicle having at least one retractable wheel assembly, the cooling system comprising:

at least one duct running from a first proximal end of the vehicle to a second distal end of the vehicle, the at least one duct having:

at the first proximal end at least one air inlet to induct cooling air into the at least one duct, wherein the at least one air inlet is oriented such that forward movement of the vehicle forces air through the inlet;

at the second distal end at least one air outlet to exhaust the cooling air from the at least one duct;

the at least one duct having, between an air inlet and an air outlet, at least one component of the vehicle requiring cooling; and the at least one duct having, between an air inlet and an air outlet, means to positively draw air through the at least one duct.

The present invention has particular utility in an amphibious vehicle having at least one mid- or rear-mounted engine or other prime mover. The air duct supplies a flow of air to the mid and/or rear of the vehicle to cool the engine and the engine bay. However, the air duct may contain other components to be cooled or additional ducts may be provided to supply cooling air to other components of the vehicle, for example a differential or a gearbox.

Preferably, the or each air duct runs substantially along the centre line of the vehicle.

Alternatively, there may be more than one air duct, two or more of which may run on opposite sides of the centre line of the vehicle. In a further embodiment, there may be a single duct running along one side of the centreline of the vehicle.

In a preferred embodiment, the walls of an air duct are separate from the walls of the hull of the vehicle.

In an alternative embodiment, at least one wall of an air duct is at least in part formed by the hull of the vehicle. In this embodiment the air flow passing through the duct may be cooled by coming into contact with the hull of the vehicle. Advantageously, the hull of the vehicle, or at least a portion thereof, is a good thermal conductor.

Preferably, the amphibious vehicle has a triple vee hull. Preferably, the triple vee hull is a cathedral hull as described in the Applicant's co-pending UK patent application no. 0411546.5 entitled 'An Amphibious Vehicle'. In one embodiment, one or more of the air ducts are formed at least in part by one or more of the vees of the hull.

In an alternative embodiment, the amphibious vehicle may be a monohull or have a catamaran hull.

Preferably, the means to draw air through the one or more ducts is a fan. The fan may be driven by any suitable means, for example, it may be attached to the crankshaft of an internal combustion engine or it may be driven by an electric or hydraulic motor.

In a preferred embodiment, the one or more air ducts pass through one or more bulkheads of the vehicle.

The flow of air through the one or more air ducts may be from front to rear or from rear to front.

According to a second aspect of the present invention there is provided a method of cooling at least one component of an amphibious vehicle having at least one retractable wheel assembly, the method comprising the steps of:

providing at least one duct running from a first proximal end of the vehicle to a second distal end of the vehicle;

locating at least one component of the vehicle requiring cooling in the at least one duct;

inducting cooling air into the at least one duct;

drawing the cooling air through the at least one duct; and exhausting the cooling air from the at least one duct.

According to a third aspect of the present invention there is provided a method for providing a flow of air through an amphibious vehicle having at least one retractable wheel assembly, the method comprising the steps of:

providing at least one duct running from a first proximal end of the vehicle to a second distal end of the vehicle; and providing a positive air pressure at an inlet to the at least one duct and a negative air pressure at the outlet of the at least one duct.

For a planing amphibian, a rear or mid-mounted engine is preferred for appropriate weight distribution.

Preferred embodiments of the present invention will now be described by way of example only with reference to the accompanying drawings, in which.

Figure 1:
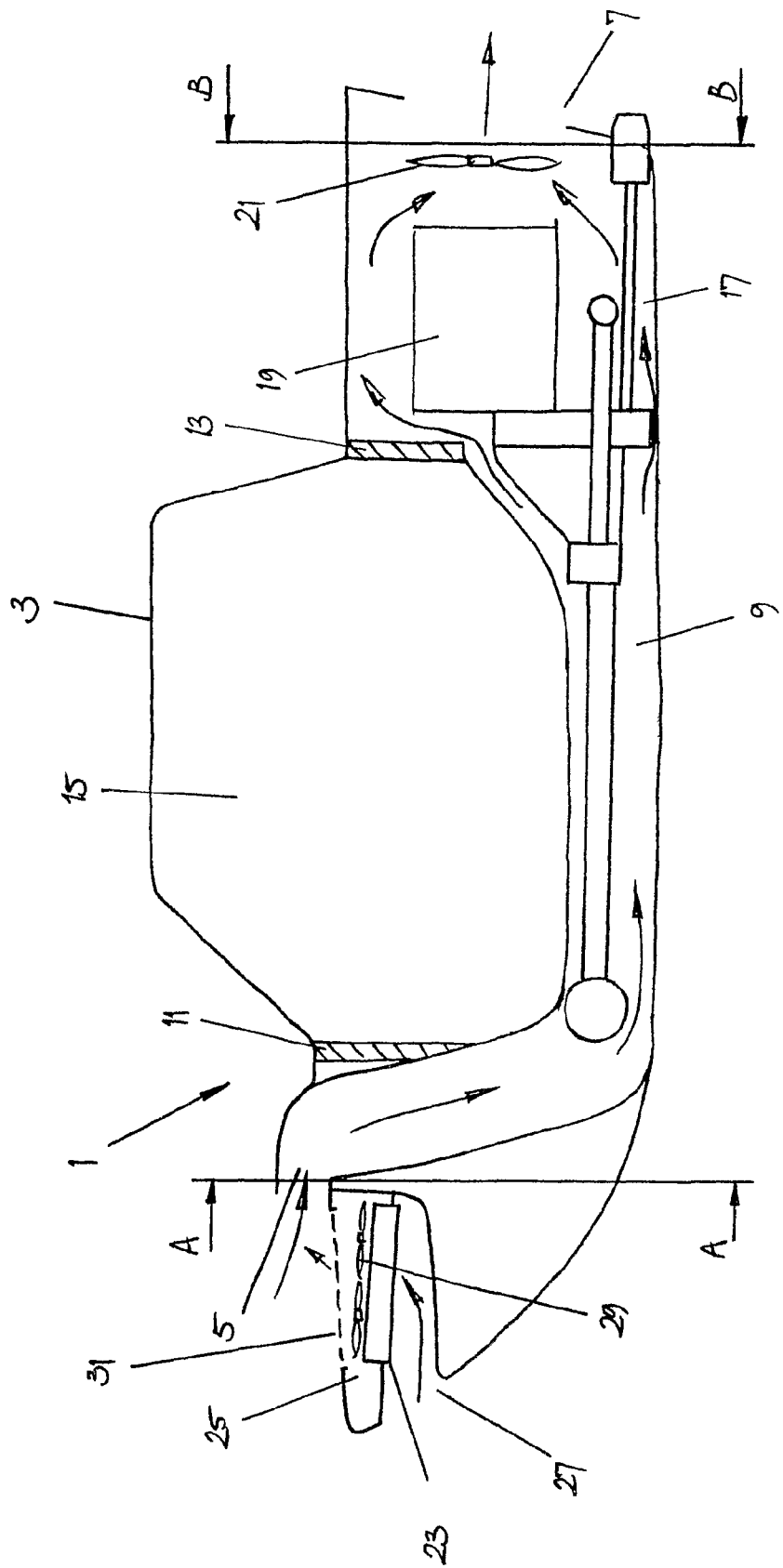
FIG. 1 is a schematic longitudinal cross-sectional view through a cooling system of an amphibious vehicle according to a first preferred embodiment of the present invention, taken along line C-C of FIG. 2.
Figure 2:
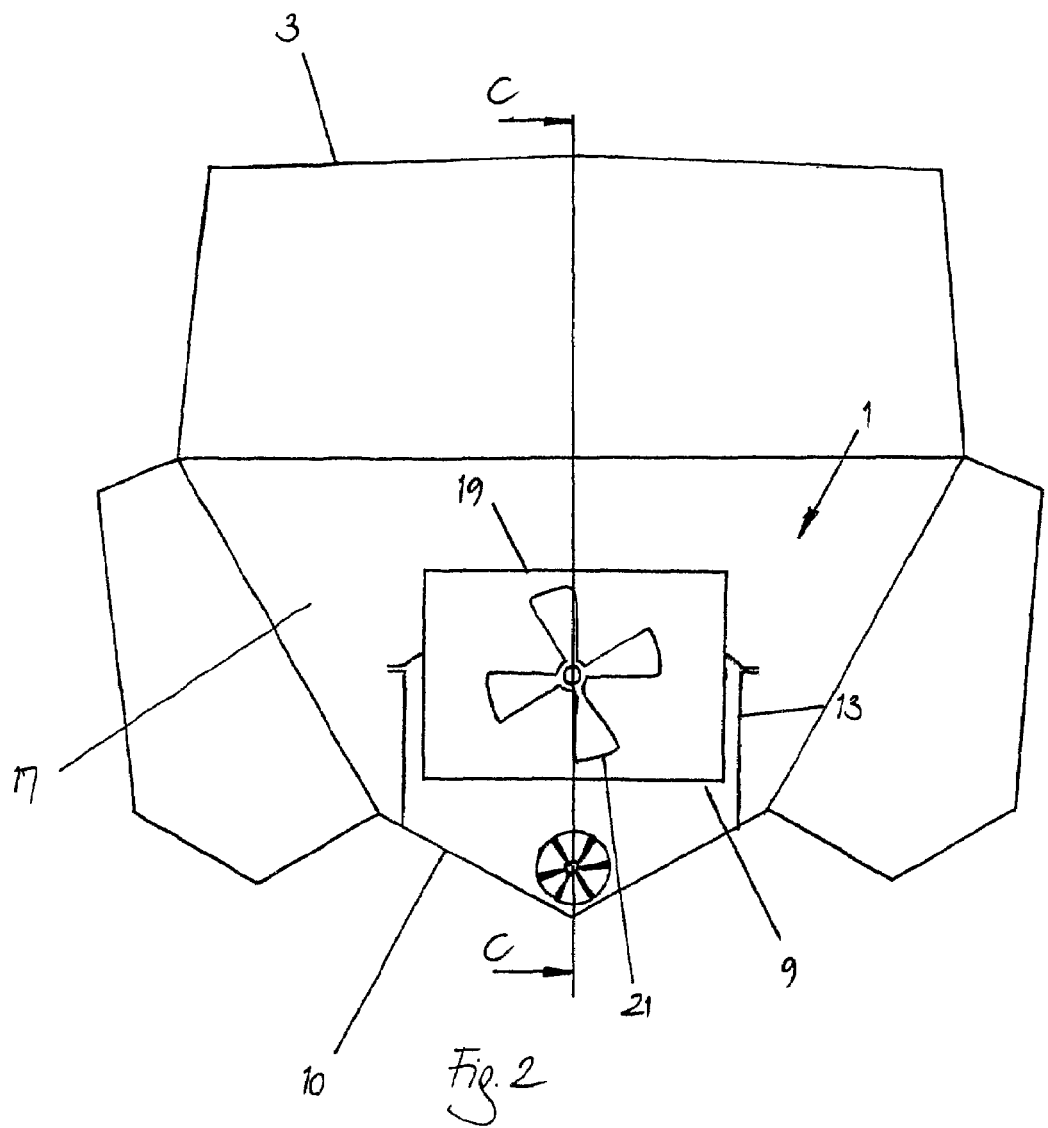
FIG. 2 is a schematic transverse cross-sectional view through the cooling system of the amphibious vehicle of FIG. 1, taken along line B-B.
Figure 4:
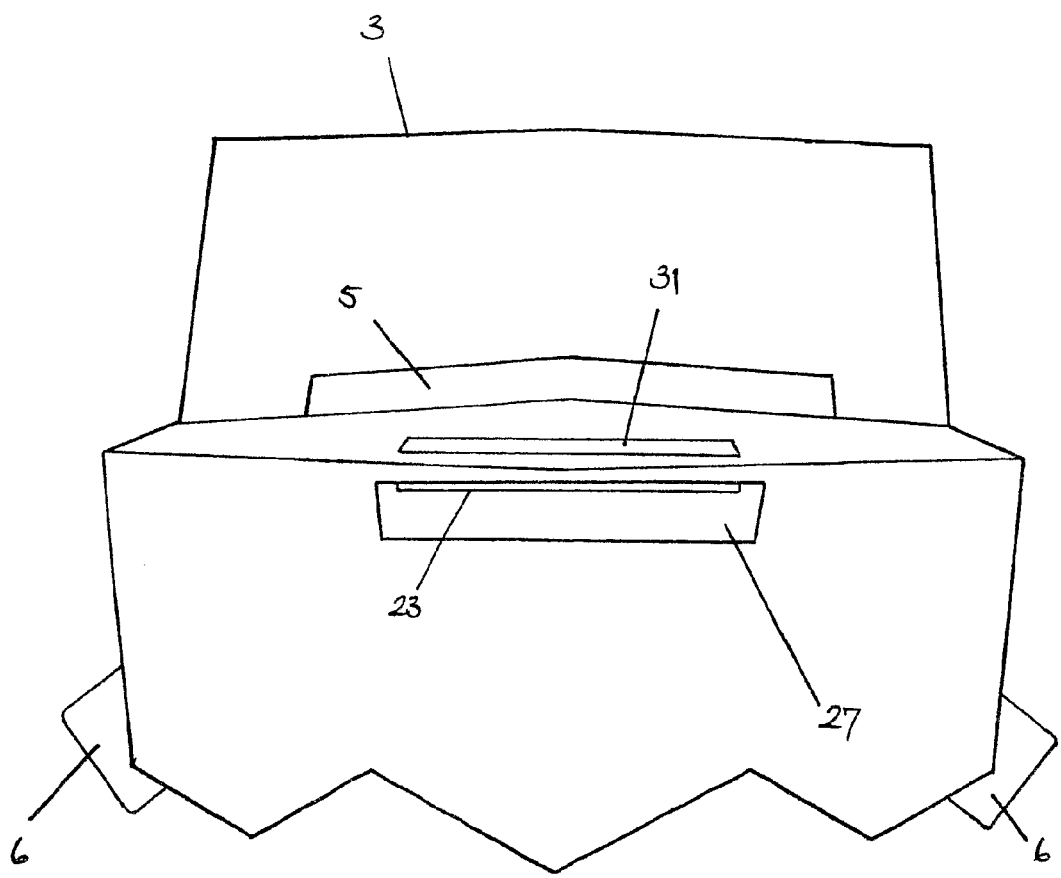
FIG. 4 is a schematic front elevation view of the cooling system and amphibious vehicle of FIG. 1.
Figure 5:
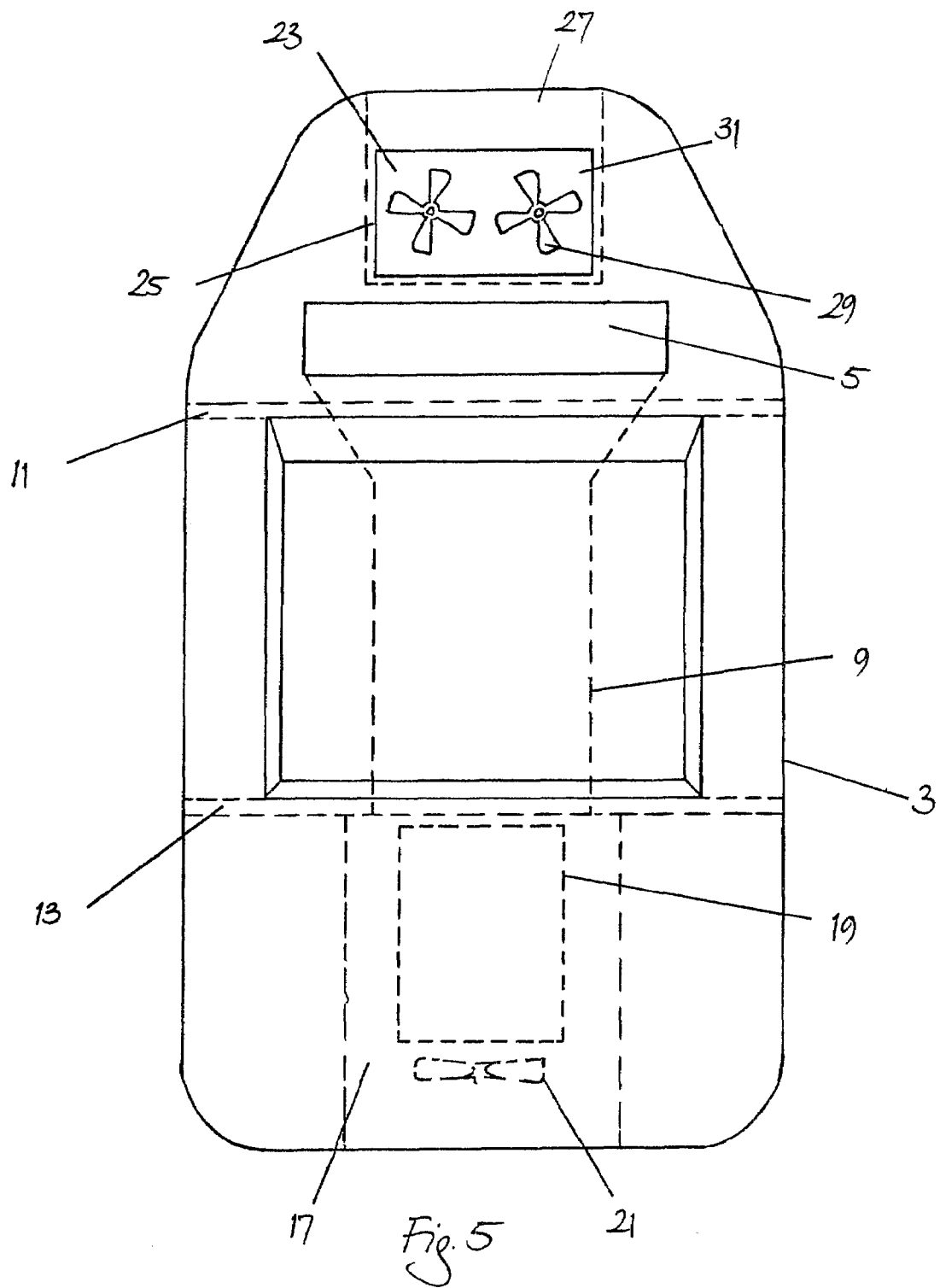
FIG. 5 is a schematic plan view of the cooling system and amphibious vehicle of FIG. 1.

A cooling system 1 of an amphibious vehicle 3 according to a first preferred embodiment of the present invention is shown in FIG. 1. At the front of the vehicle 3 is an air inlet 5. At the rear of the vehicle 3 is an air outlet 7. The air inlet 5 is a slot provided transversely and centrally across the vehicle 3, as shown in FIG. 4. The air outlet 7 is a centrally located opening in the stern. A duct 9 extends along the centre line of the vehicle 3, in the central vee 10 (FIG. 2) of the cathedral hull, the duct 9 extending between the air inlet 5 and the air outlet 7.

Figure 3:
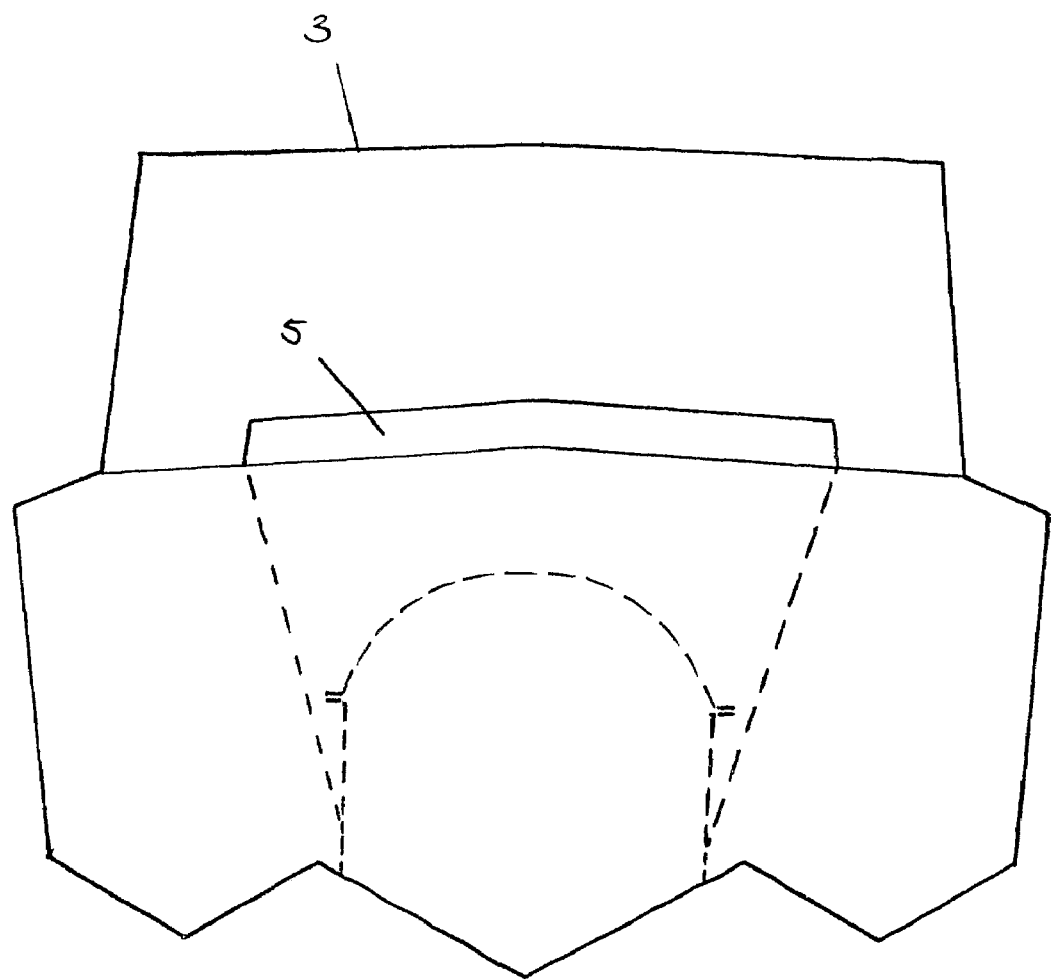
FIG. 3 is a schematic transverse cross-sectional view through the cooling system of the amphibious vehicle of FIG. 1, taken along line A-A.

Between the air inlet 5 and the air outlet 7 the duct 9 passes through a front bulkhead 11 and a rear bulkhead 13 of a passenger compartment 15. The cross-sectional profile of the duct 9 changes from a shallow rectangle at the air inlet 5 to a deeper rectangle as the duct 9 passes through the front bulkhead 11, as shown in FIG. 3. Vehicle components may be contained within the duct 9 at any point along its length, as shown in FIG. 1.

At the rear bulkhead 13, the duct 9 enters the engine bay 17 which contains the engine 19 and other components, for example transmission components. A fan 21 is provided to the rear of the engine bay 17, adjacent to the air outlet 7, and is arranged so as to be of substantially vertical orientation.

Air flow through the duct 9 is achieved by air being forced through the air inlet 5 by virtue of forward movement of the vehicle 3 (so-called ram effect) and/or as a result of a negative pressure created in the duct 9 by operation of the fan 21. The air drawn through the duct 9 by the fan 21 is sufficient to cool the components of the vehicle 3 when it is stationary and the engine is at an idle, as the heat generated by the components is at a minimum. When the vehicle 3 is moving and the components are generating a much greater amount of heat, the combination of the forcing of air through the air inlet 5 (ram air) and the drawing of air through the duct 9 results in a greater flow of air as required for sufficient cooling.

Optionally, a separate, dedicated liquid cooling system is attached to the engine 19. This optional liquid cooling system is provided in addition to the cooling system according to the present invention. A radiator 23 is located at the front of the vehicle 3 in a separate compartment 25. The compartment 25 is provided with an air inlet 27 through which air is forced (ram effect) by forward movement of the vehicle. In addition, or alternatively, fans 29 are provided to draw air through the radiator 23 to provide additional cooling when the engine coolant temperature exceeds a preset threshold temperature. The air that passes through the radiator 23 is exhausted through the air outlet 31. Optionally, the air exhausted via air outlet 31 may be ducted away to the side of the vehicle or otherwise (entirely or to one degree or other) such that it is not inducted by the air inlet 5. Such an alternative arrangement is adopted in the second embodiment of the present invention shown in FIG. 6, where it can be seen that the air outlet takes the form of two air outlets 31 provided one on either side of the vehicle 3. The radiator 23 is oriented substantially horizontally to protect the radiator fins from being damaged by water forced through the air inlet 27.

The pipes of the liquid cooling system may be contained at least in part within the duct 9 or may be routed adjacent thereto so that the temperature of the coolant liquid flowing through these can be reduced on both the radiator inlet and outlet legs. Furthermore, accommodating the pipes within the duct 9 avoids the need to route such pipes directly through bulkheads of the vehicle 3.

In addition to providing cooling to the components of the vehicle 3, the flow of air through the duct 9 can be used to ensure that there is not a build up of potentially explosive fumes, for example petrol fumes, in the engine bay 17 of the vehicle 3. The flow of air may also be used to purge petrol fumes vented from a petrol tank. As such, the present invention provides additional ventilation for the vehicle.

Figure 6:
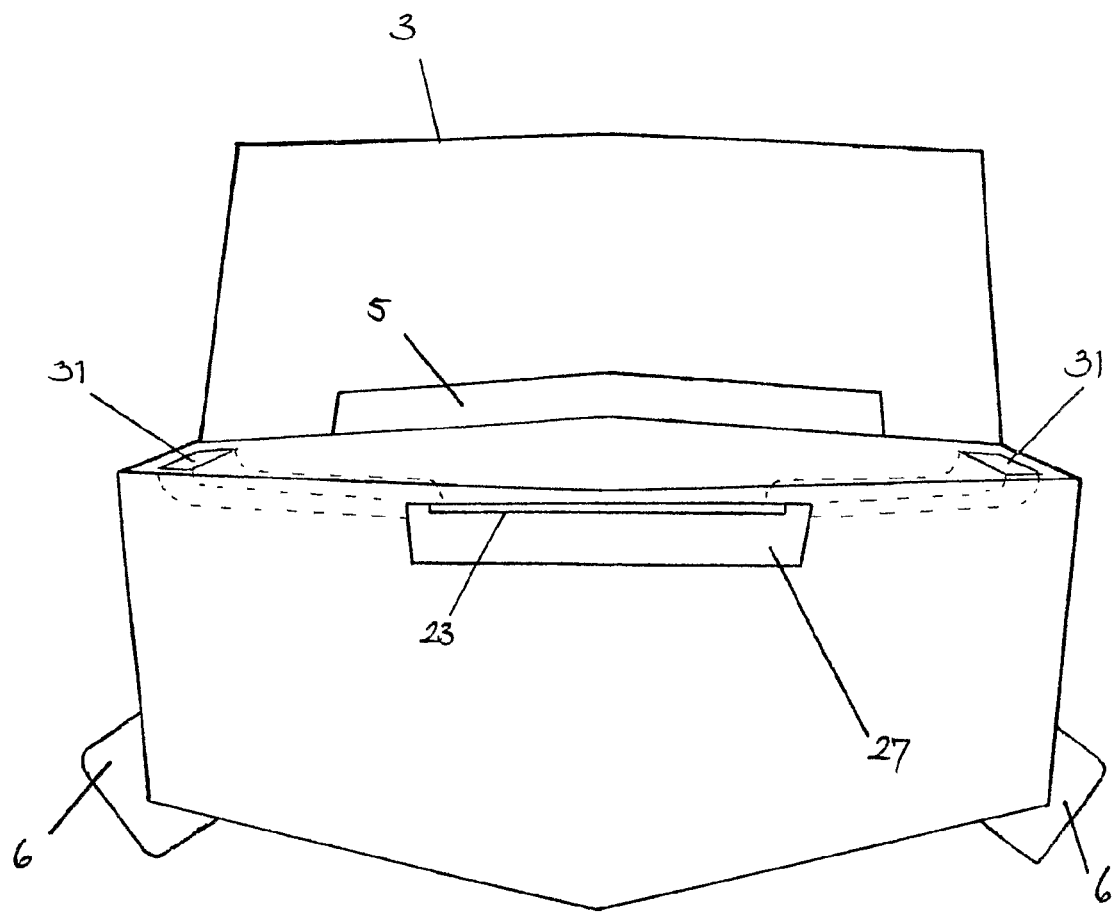
FIG. 6 is a schematic front elevation view of a cooling system and amphibious vehicle according to a second embodiment of the present invention.

Whilst the cooling system described above is shown in an amphibious vehicle having a triple vee cathedral hull, it will be appreciated that the present invention may be employed in an amphibious vehicle having any hull type or hull form. In this regard, FIG. 6 schematically illustrates a front elevation view of a monohull amphibious vehicle provided with the cooling system according to the present invention.

Furthermore, it will be appreciated that the duct 9 may take any suitable form. The exact form adopted is dependent, inter alia, upon the hull type, the number of components to be cooled and their location within the vehicle, and packaging constraints. For example, a plurality of ducts may be provided rather than just one. Consequently, the number of air inlets and air outlets is variable. The or each duct may have branches and any such branches may remain separate or recombine into or to form one or more ducts. The ducts may be of tortuous or labyrinthine form. In addition, the cross sectional area or form of the or each duct may be variable and/or different to one another. It will thus be appreciated that the flexibility afforded by the present invention lends itself to particular implementation in an amphibious vehicle where different hull designs, shapes and sizes are offered to customers and/or where the amphibious vehicle has at least one wheel assembly which is retractable above the waterline (packaging constraints here are key).

To optimise performance of the amphibious vehicle both on land and on water, it is preferred that each wheel assembly (including wheel 6, FIGS. 4 and 6) is retractable above the waterline and that the vehicle can plane on water. To this end, a rear or mid-mounted engine is preferred for appropriate weight distribution. It is especially preferred that the engine is located in the rear two thirds of the length of the vehicle, and more preferably the rear half of the vehicle. Consequently, it is preferred that at least one of the one or more ducts extends along at least one third of the length of the vehicle, more preferably at least half of the length of the vehicle.

The invention claimed is:

1. A cooling system of an amphibious vehicle having a prime mover cooled by liquid coolant that circulates through a radiator and at least one retractable wheel assembly, the cooling system comprising:

at least one duct running from a first proximal end of the vehicle to a second distal end of the vehicle wherein the radiator is not located within the duct, the at least one duct having:

at the first proximal end at least one air inlet to induct cooling air into the at least one duct, wherein the at least one air inlet is oriented such that forward movement of the vehicle forces air through the inlet;

at the second distal end at least one air outlet to exhaust the cooling air from the at least one duct;

the at least one duct having, between an air inlet and an air outlet, at least one component of the vehicle requiring cooling; and the at least one duct having, between said air inlet and said air outlet, means to positively draw air through the at least one duct.

2. A cooling system as claimed in claim 1, wherein the at least one duct runs substantially along the centre line of the vehicle.

3. A cooling system as claimed in claim 1, wherein at least two ducts run along the vehicle, at least one on each opposite side of the centre line of the vehicle.

4. A cooling system as claimed in claim 1, wherein the wall or walls of the at least one duct are at least in part separate to the wall or walls of the hull of the vehicle.

5. A cooling system as claimed in claim 1, wherein at least one wall of the at least one duct is at least in part formed by the hull of the vehicle.

6. A cooling system as claimed in claim 1, wherein the amphibious vehicle comprises a triple vee hull.

7. A cooling system as claimed in claim 1, wherein the triple vee hull is a cathedral hull.

8. A cooling system as claimed in claim 1, wherein the amphibious vehicle comprises a single vee hull.

9. A cooling system as claimed in claim 8, wherein the single vee hull is a monohull.

10. A cooling system as claimed in claim 1, wherein the amphibious vehicle comprises a double vee hull.

11. A cooling system as claimed in claim 10, wherein the double vee hull is a catamaran.

12. A cooling system as claimed in claim 1, wherein the amphibious vehicle comprises a multiple vee hull.

13. A cooling system as claimed in claim 1, wherein one or more of the at least one ducts is formed at least in part in or by one or more of the vees of the hull.

14. A cooling system as claimed in claim 1, wherein the means to draw air through the duct is a fan.

15. A cooling system as claimed in claim 14, wherein the fan is oriented substantially vertically.

16. A cooling system as claimed in claim 1, wherein one or more of the at least one ducts pass through one or more bulkheads of the vehicle.

17. A cooling system as claimed in claim 1, wherein one or more of the at least one ducts comprises one or more branches and/or side chambers, and/or Helmholtz chambers, and/or resonator tubes and/or resonator chambers.

18. A cooling system as claimed in claim 1, wherein one or more of the at least one ducts is of tortuous form.

19. A cooling system as claimed in claim 1, wherein one or more of the at least one ducts is of labyrinthine form.

20. A cooling system as claimed in any claim 1, wherein one or more of the at least one ducts is of variable cross section along its length.

21. A cooling system as claimed in any claim 1, wherein one or more of the at least one ducts extends at least one third of the length of the vehicle.

22. A cooling system as claimed in claim 1, wherein one or more of the at least one ducts extends at least half of the length of the vehicle.

23. A cooling system as claimed in claim 1, wherein the at least one component of the vehicle requiring cooling is a prime mover.

24. A cooling system as claimed in claim 23 wherein the prime mover is an internal combustion engine.

25. A cooling system as claimed in claim 23 wherein the prime mover is located in one or more of the at least one ducts.

26. A cooling system as claimed in claim 1, wherein the at least one component of the vehicle requiring cooling is a prime mover located in the rear two-thirds of the vehicle nearest the distal end.

27. A cooling system as claimed in claim 1, wherein the at least one component of the vehicle requiring cooling is a prime mover located in the rear half of the vehicle nearest the distal end.

28. A cooling system as claimed in claim 1, further comprising a separate liquid cooling system for cooling a prime mover.

29. A cooling system as claimed in claim 28, comprising a substantially horizontally oriented radiator and a fan.

30. A cooling system as claimed in claim 1, wherein said radiator is positioned forward of said prime mover.

31. A cooling system as claimed in claim 1, wherein said radiator is positioned forward of said air inlet.

* * * * *